US009220285B2

(12) United States Patent
De Ruiter et al.

(10) Patent No.: US 9,220,285 B2
(45) Date of Patent: Dec. 29, 2015

(54) AERATED FOOD PRODUCT AND METHOD OF MANUFACTURING SUCH PRODUCT

(75) Inventors: Gerhard Adriaan De Ruiter, Heeswijk-Dinther (NL); Robert Hendrikus Paardekooper, Alblasserdam (NL); Ahmaldilfitri Noor, Nilai (MY); Catrienus De Jong, Ede (NL)

(73) Assignee: SIME DARBY MALAYSIA BERHAD, Kuala Lumpur (MY)

( * ) Notice: Subject to any disclaimer, the term of this patent is extended or adjusted under 35 U.S.C. 154(b) by 1645 days.

(21) Appl. No.: 12/278,247

(22) PCT Filed: Jan. 29, 2007

(86) PCT No.: PCT/NL2007/050036
§ 371 (c)(1),
(2), (4) Date: Jun. 3, 2009

(87) PCT Pub. No.: WO2007/086748
PCT Pub. Date: Aug. 2, 2007

(65) Prior Publication Data
US 2009/0304893 A1    Dec. 10, 2009

(30) Foreign Application Priority Data

Jan. 30, 2006  (EP) ..................................... 06101032

(51) Int. Cl.
| | | |
|---|---|---|
| *A23G 9/32* | (2006.01) | |
| *A23L 1/00* | (2006.01) | |
| *A23L 1/19* | (2006.01) | |

(52) U.S. Cl.
CPC ............... *A23G 9/327* (2013.01); *A23L 1/0097* (2013.01); *A23L 1/19* (2013.01)

(58) Field of Classification Search
USPC ........................ 426/564, 565, 601, 607, 658
See application file for complete search history.

(56) References Cited

U.S. PATENT DOCUMENTS

| | | | | |
|---|---|---|---|---|
| 4,396,633 | A * | 8/1983 | Tresser ........................ | 426/100 |
| 4,461,777 | A * | 7/1984 | Murase et al. ............. | 426/330.6 |
| 2008/0206425 | A1* | 8/2008 | Dilley et al. .................. | 426/565 |
| 2008/0268114 | A1* | 10/2008 | Adamcikova et al. ........ | 426/312 |

FOREIGN PATENT DOCUMENTS

| | | | |
|---|---|---|---|
| EP | 0740905 | A1 | 11/1996 |
| EP | 740905 | A1 * | 11/1996 |
| GB | 832377 | A | 4/1960 |
| GB | 1444820 | A | 8/1976 |
| JP | 55153561 | * | 11/1980 ............... A23G 9/02 |
| JP | 55153561 | A | 11/1980 |
| WO | WO 2006066979 | A1 * | 6/2006 |

OTHER PUBLICATIONS

Scientific Psychic (Fatty Acid Composition of Some Common Edible fats and Oils, p. 1, http://www.scientificpsychic.com/fitness/fattyacids1.html printed Mar. 30, 2012.*
Wai-Lin et al, Palm oil and fractions, p. 26, printed Mar. 30, 2012.*
Food Oils and Fats: Technology, Utilization and Nutrition By H.W. Lawson (1995), pp. 28-31.*
Malaysian Palm Oil Board About Palm Oil printed May 12, 2014, pp. 1-10.*
Tan et al "Fatty acid and triacylglycerol compositions of palm stearin" p. 1, col. 3, 1981.*
Etienne Deffense "Dry multiple fractionation: trends in products and applications" Lipid Technology Mar. 1995, pp. 34-38.*
Gunstone, Frank et al (ed.) The Lipid Handbook, $3^{rd}$ Edition, CRC Press 2007, pp. 39-43.*
Siew et al., "Identity Characteristics of Malaysian Palm Oil Products: Fatty Acid and Triglyceride Composition and Solid Fat Content," 1993, pp. 38-46, vol. 5, ISSN 0128-1828, Institut Penyelidikan Kelapa Sawit, Kuala Lumpur, MY.

* cited by examiner

*Primary Examiner* — Kelly Bekker
(74) *Attorney, Agent, or Firm* — Browdy and Neimark, PLLC

(57) ABSTRACT

One aspect of the present invention relates to an aerated food product, such as ice cream, comprising at least 0.5 wt. % of fat and at least 30 wt. % of water, said fat being characterized by the following solid fat profile: $30\% < N_{10} < 80\%$; $3\% < N_{20} < 55\%$; $N_{10} - N_{30} >= 30\%$; said fat further being characterized by the following fatty acid composition: less than 56% unsaturated fatty acids; not more than 60% unsaturated fatty acids; at least 1.5% $C_{12}$-$C_{14}$ fatty acids; $<=1.5\%$ ω-3 unsaturated fatty acids; $<=25\%$ saturated $C_{12}$-$C_{14}$ fatty acids; and $<=5\%$ $C_4$-$C_{10}$ fatty acids; all percentages being calculated by weight of the total amount of fatty acids. The invention also provides a method of manufacturing the aforementioned aerated food product.

7 Claims, No Drawings

AERATED FOOD PRODUCT AND METHOD OF MANUFACTURING SUCH PRODUCT

TECHNICAL FIELD OF THE INVENTION

The present invention relates to aerated food products such as ice cream. More particularly, the present invention relates to aerated food products comprising fat and water. The invention also concerns a method of manufacturing such aerated food products.

BACKGROUND OF THE INVENTION

The main components of ice cream include water, sugars and fat. Butter oil is most commonly used as the fat ingredient in ice cream. Vegetable oils are also applied in ice creams, coconut oil being most commonly used. Coconut oil offers the advantage that, like butter oil, it has a relatively high solid fat content at low temperatures (e.g. between 5 and 10° C.) and a relatively low solid fat content at elevated temperatures, e.g. between 30 and 35° C. Furthermore, coconut oil contains relatively small amounts of unsaturated fatty acids, which means that it does not easily oxidise. The relatively small amount of unsaturated fatty acids found in coconut oil also constitute a serious drawback as it is generally accepted that oil that are low in unsaturated fatty acids do not fit in a healthy diet. The same holds true for butter oil, be it to a slightly lesser extent.

The use in ice cream of vegetable fat compositions, other than coconut oil, has been suggested in a number of prior art publications. U.S. Pat. No. 5,756,143 describes an interesterified triglyceride composition that contains relatively high amounts of polyunsaturated fatty acids, but that displays better oxidation stability than non-interesterified triglycerides with similar compositions. In the US patent an ice cream product is described that contains a fat blend that is composed of 90 wt. % palm oil and 10 wt. % of an interesterified blend of: 55 wt. % of a tuna oil olein fraction; 35 wt. % of high oleic sunflower oil; and 10 wt. % of sunflower oil. It is shown in the patent that the tuna oil olein fraction contains more than 50% ω-3 unsaturated fatty acids by weight of the total amount of fatty acids. These ω-3 unsaturated fatty acids are extremely rapidly oxidised to volatile aldehydes that impart a pronounced 'fishy' flavour. ω-3 unsaturated fatty acids may be present in the fat of the present food product in a concentration of up to 1.5 wt. % without giving rise to unacceptable flavour formation.

GB 1 444 820 is concerned with food fats containing palm and lauric fats that are suitable for use in ice-cream. The fat compositions taught by the British patent have an iodine value of 30-50, a slip melting point of 37-45° C. The fat compositions disclosed in the British patent are characterised by a saturated fatty acid content of more than 60 wt. %.

The abstract of JP 55 153561 refers to ice creams comprising a fat blend that contains 50-0 wt. % milk fat and 50-100 wt. % of fat consisting of (i) 50-100 wt. % of the medium melting point fraction of palm oil and (ii) 50-0 wt. % of other fat.

It would be desirable to replace coconut oil and butter oil in ice cream by oils that contain substantially larger amounts of unsaturated fatty acids. However, the use of such oils in aerated food products, such as ice cream, is associated with serious problems as these oils are easily oxidised. Oxidation of unsaturated vegetable oils leads to objectionable off-flavours that are often described as 'cardboard-like'. Aerated food products containing unsaturated oils are particularly vulnerable to fat oxidation as they comprise a very large oil-air interface.

It is known that the oxidation stability of vegetable oils may be improved by hydrogenating these oils. Hydrogenation removes double bonds from unsaturated fatty acids, making them much less vulnerable to oxidation, especially if the oil is fully hydrogenated, in which case it contains only saturated fatty acids. However, hydrogenation also affects the melting characteristics of the oil. The melting behaviour of vegetable oils that have been hydrogenated to a considerable degree (e.g. fats with a melting point of more than 50° C.) is often found to be unsatisfactory. In addition, consumers increasingly object to the use of hydrogenated oils food products, especially if these hydrogenated oils contain appreciable amounts of trans fatty acids.

Consequently, there is a need for fats that contain substantial amounts of unsaturated fatty acids and that can suitably be applied in aerated food products without giving rise to serious off-flavour problems.

SUMMARY OF THE INVENTION

The inventors have found that the aforementioned need is fulfilled by a fat that is characterised by the following solid fat profile:
30%<$N_{10}$<80%;
3%<$N_{20}$<55%;
$N_{10}$-$N_{30}$≥30%;
as well as the following fatty acid composition:
less than 56% saturated fatty acids;
not more than 60% unsaturated fatty acids;
at least 1.5% $C_{12}$-$C_{14}$ fatty acids;
≤1.5% ω-3 unsaturated fatty acids;
≤25% saturated $C_{12}$-$C_{14}$ fatty acids; and
≤5% $C_4$-$C_{10}$ fatty acids;
all percentages being calculated by weight of the total amount of fatty acids.

Fats that exhibit the above mentioned combination of features provide substantial quantities of unsaturated fatty acids, display favourable melting behaviour and do not give rise to unacceptable off-flavour formation as a result of the oxidation of unsaturated fatty acids. Unlike butter oil, the fat employed in the present aerated food product contains not more than a minor amount of $C_4$-$C_{10}$ fatty acids.

DETAILED DESCRIPTION OF THE INVENTION

Accordingly, one aspect of the invention relates to an aerated food product comprising at least 0.5 wt. % of fat and at least 30 wt. % of water, said fat being characterised by the following solid fat profile:
30%<$N_{10}$<80%;
3%<$N_{20}$<55%;
$N_{10}$-$N_{30}$≥30%;
said fat further being characterised by the following fatty acid composition:
less than 56% saturated fatty acids;
not more than 60% unsaturated fatty acids;
at least 1.5% $C_{12}$-$C_{14}$ fatty acids;
≤1.5. % ω-3 unsaturated fatty acids;
≤25% saturated $C_{12}$-$C_{14}$ fatty acids; and
≤5% $C_4$-$C_{10}$ fatty acids;
all percentages being calculated by weight of the total amount of fatty acids.

The terms "oil" and "fat" are deemed to be synonyms and encompass lipids such as triglycerides, diglycerides, monoglycerides, phosphoglycerides etc. Most preferably, the oil (or fat) employed in accordance with the present invention is a triglyceride fat.

The term "fatty acid" as used herein encompasses fatty acid residues contained, for instance, in triglycerides.

The N-value $N_t$ equals the solid fat content of a fat at a temperature of t° C. as measured by means of ISO 8292—Animal and vegetable fats and oils—Determination of solid fat content—Pulsed nuclear magnetic resonance method.

Unless indicated otherwise, fatty acid concentrations are expressed as a percentage of the total weight of fatty acid residues and free fatty acids contained in the fat of the aerated food product. The fatty acid concentrations are suitably determined by means of ISO 5509—Animal and vegetable fats and oils—Preparation of methyl esters of fatty acids and ISO 5508—Animal and vegetable fats and oils—Analysis by gas chromatography of methyl esters of fatty acids.

Examples of aerated food products according to the present invention include ice cream, whipped cream, fillings, toppings and aerated desserts. Most preferably, the present aerated food product is a frozen food product, preferably ice cream. Typically, the present food product has a density of less than 0.8 g/ml, preferably of less than 0.7 g/ml.

According to a particularly preferred embodiment, the fat contained in the present aerated food product contains at least 20% of palmitic acid by weight of total fatty acids. Even more preferably, said fat contains at least 30%, most preferably at least 35% palmitic acid by weight of total fatty acids. The presence of appreciable amounts of palmitic acid in the fat is associated with favourable melting behaviour as palmitic acid contributes to the solid fat content at low temperatures and much less so to the solid fat content at elevated temperatures. Typically, the fat of the present aerated food product contains not more than 48%, preferably not more than 45% and most preferably not more than 42% palmitic acid by weight of total fatty acids.

Besides palmitic acid ($C_{16}$ saturated fatty acid), the fat employed in the aerated food product may contain appreciable amounts of other saturated fatty acids such as stearic acid ($C_{18}$ saturated fatty acid), myristic acid ($C_{14}$ saturated fatty acid) and lauric acid ($C_{12}$ saturated fatty acid). Typically, palmitic acid represents at least 40% by weight of the total amount of saturated fatty acids. Preferably, palmitic acid represents at least 50 wt. % of the saturated fatty acids. Most preferably, palmitic acid represents at least 60 wt. % of the saturated fatty acids.

Unlike coconut oil and palm kernel oil, the fat employed in accordance with the invention contains less than 25% $C_{12}$-$C_{14}$ fatty acids by weight of total fatty acids. Preferably, the fat contains less than 22%, more preferably less than 20% and most preferably less than 15% $C_{12}$-$C_{14}$ fatty acids by weight of total fatty acids. Furthermore, $C_{12}$-$C_{14}$ fatty acids typically represent less than 50 wt. %, preferably less than 30 wt. % of the saturated fatty acids. Most preferably, $C_{12}$-$C_{14}$ fatty acids represent less than 15 wt. % of the saturated fatty acids contained in the fat of the present aerated food product.

The inventors have observed that if the fat comprised in the product contains a small amount of saturated $C_{12}$-$C_{14}$ fatty acids, i.e. at least 1.5% by weight of total fatty acids, the sensory characteristics of the present food product are optimal. According to a particularly preferred embodiment, said fat contains at least 2%, more preferably at least 2.5%, even more preferably 3%, especially at least 5% and most preferably at least 6% by weight of saturated $C_{12}$-$C_{14}$ fatty acids.

According to a particularly preferred embodiment, the fatty acid composition of the fat contained the present food product is characterised as follows:

3%<$C_{12}$-$C_{14}$<20%;
25%<$C_{16}$<45%;
30%<$C_{18}$<55%;
35%<unsaturated fatty acids<55%;

all percentages being calculated by weight of the total amount of fatty acids.

The fat contained in the present food product should contain an appreciable amount of saturated fatty acids as this is required to provide substantial amounts of solid fat at low temperatures. The in-mouth melting of this solid fat contributes significantly to the eating quality of the food product. At the same time, as explained above, the present invention aims to provide an aerated product comprising a fat that contains appreciable amounts of unsaturated fatty acids.

In an advantageous embodiment of the invention, saturated fatty acids represent at least 40 wt. %, preferably at least 42 wt. % and more preferably at least 45 wt. % of the total amount of fatty acids contained in the fat of the present product.

Monounsaturated fatty acids preferably represent 20-55 wt. %, more preferably 25-50 wt. % and most preferably 30-42 wt. % of the total amount of fatty acids.

As mentioned herein before, ω-3 unsaturated fatty acids should not be present in the fat in appreciable amounts. Preferably, ω-3 unsaturated fatty acids, if present, are contained therein in a concentration of less than 1.0%, more preferably of less than 0.5% by weight of the total amount of fatty acids. Most preferably, the fat contains ω-3 unsaturated fatty acids in a concentration of not more than 0.2% by weight of the total amount of fatty acids.

The fat employed in the present aerated food product preferably does not contain any animal fat. Most preferably, the fat is exclusively composed of vegetable fat. According to a particularly preferred embodiment, the fat of the present product is obtained from two or more different vegetables sources. Particularly preferred are fats that are composed of at least 50 wt. % or even at least 60% of palm oil and/or palm oil fraction and between 5 and 50 wt. % of a lauric fat selected from coconut oil, palm kernel oil and mixtures thereof.

The fat employed in the present food product preferably contains a limited amount of solid fat at elevated temperatures. Typically, the fat has an $N_{30}$ that does not exceed 20%. Even more preferably, the solid fat content $N_{30}$ does not exceed 15%, most preferably it does not exceed 10%.

The present food product preferably contains a so called steep melting fat, especially a fat that melts very quickly between 10 and 30° C. Accordingly, in a preferred embodiment, the fat contained in the present product is characterised in that $N_{10}$–$N_{30}$≥35%, preferably in that $N_{10}$–$N_{30}$≥40%. Food products exhibiting these solid fat contents will impart a highly desirable in-mouth melting behaviour, especially if the product has a temperature of 10° C. or less upon ingestion.

Advantageously, the fat exhibits a steep melting curve between 10 and 20° C. Accordingly, in a preferred embodiment, the fat is characterised in that $N_{10}$–$N_{20}$≥20%, more preferably in that $N_{10}$–$N_{20}$≥30%.

The food product of the present invention preferably contains a fat that contains a large amount of solid fat a temperature of about 10° C. Typically the solid fat content $N_{10}$ is within the range of 40-75%. More preferably, the solid fat content $N_{10}$ is within the range of 45-70%, most preferably within the range of 47-65 wt. %.

Typically, the solid fat content $N_{20}$ is in the range of 4-35%. More preferably, the solid fat content $N_{20}$ is within the range of 6-32%, most preferably within the range of 7-20 wt. %.

It is highly desirable that the fat contained in the present food product melts almost completely at in-mouth temperatures. Consequently, the solid fat content $N_{35}$ preferably does not exceed 10%, more preferably it does not exceed 5%. Most preferably, the solid fat content $N_{35}$ does not exceed 3%.

The present food product may contain minor quantities of hydrogenated fats, especially fully hydrogenated fats. According to a preferred embodiment, however, the product does not contain hydrogenated fat. Likewise, the present product preferably contains no appreciable amounts of trans-unsaturated fatty acids. Typically, the product contains less than 3% trans-unsaturated fatty acids by weight of the total amount of fatty acids. Preferably, the product contains less than 1%, more preferably less than 0.8% and most preferably less than 0.7% trans-unsaturated fatty acids by weight of the total amount of fatty acids.

The fat contained in the present food product may suitably contain interesterified fats. According to a particularly preferred embodiment, the fat essentially consists of an interesterified fat blend. The use of an interesterified fat offers the advantage that despite relatively high levels of unsaturated fatty acids high solid fat contents can be achieved. Interesterified fat blends are characterised in that the carbon number distribution of the triglycerides contained in the fat is essentially Gaussian.

In accordance with the present invention a particularly preferred aerated food product comprises:
2-20 wt. % fat, preferably 4-12 wt. % fat;
4-25 wt. % of carbohydrates and/or sugar replacers;
2-10 wt. % of protein; and
55-75 wt. % water.

The carbohydrates employed in the present product are advantageously selected from the group of monosaccharides, disaccharides and combinations thereof. An example of a suitable sugar replacers include sucralose. Most preferably, the present food product contains 4-25 wt. % of carbohydrates.

Another aspect of the invention relates to a process of manufacturing a fat blend with a solid fat profile and a fatty acid composition as defined herein before, said method comprising admixing:
5-50 wt. % of a lauric fat component comprising at least 50% of $C_{10}$-$C_{14}$ fatty acids by weight of the total amount of fatty acids contained therein;
0-90 wt % of a palm olein with an iodine value of at least 50; and
0-50 wt. % of a palm mid fraction with an iodine value in the range of 35-45;
optionally followed by interesterification of the resulting mixture;
wherein the combination of lauric fat component, palm olein and palm mid fraction represents at least 90 wt. % of the optionally interesterified fat blend obtained by the process.

The invention is further illustrated by means of the following examples:

EXAMPLES

Example 1

Ice cream samples were prepared on the basis of the following recipe:

| Ingredient | % by weight |
|---|---|
| Fat | 8 |
| Skim milk powder | 11 |
| Sucrose | 12 |
| Corn syrup solids [1] | 6 |
| Emulsifier, stabiliser mix [2] | 0.55 |
| Water | 62.45 |

[1] Cremodan ® SE 30 (ex Danisco)
[2] GL 0193 (ex Cerestar)

Six different fats were used to produce ice cream samples 1A, 1B, 1C, 1D and 1E. The composition of these fats is depicted in the following table:

| Sample | Composition of fat |
|---|---|
| 1A | Palm oil |
| 1B | Coconut oil |
| 1C | 90:10 blend of palm olein (IV = 56) and coconut oil |
| 1D | Interesterified blend (60:40) of palm oil and palm kernel oil |
| 1E | 60:30:10 blend of palm olein (IV = 56), palm mid fraction (IV = 43) and coconut oil |

The fatty acid composition of the fats was analysed, yielding the following result (concentrations expressed in % by weigh of total fatty acids):

|  | 1A | 1B | 1C | 1D | 1E |
|---|---|---|---|---|---|
| C6:0 |  | 0.3 |  |  |  |
| C8:0 |  | 6.0 | 0.6 | 2.4 | 0.6 |
| C10:0 |  | 5.6 | 0.6 | 2.2 | 0.6 |
| C12:0 | 0.2 | 47.8 | 5.1 | 19.2 | 5.0 |
| C14:0 | 1.1 | 19.0 | 2.8 | 8.3 | 2.8 |
| C16:0 | 43.8 | 9.7 | 37.4 | 30.5 | 39.3 |
| C16:1 | 0.2 |  | 0.2 |  | 0.2 |
| C18:0 | 4.5 | 2.9 | 4.2 | 3.7 | 4.4 |
| C18:1 | 38.4 | 6.9 | 38.3 | 25.8 | 37.2 |
| C18:2 | 10.9 | 1.7 | 9.8 | 6.8 | 9.0 |
| C18:3 | 0.2 |  | 0.3 | 0.2 | 0.2 |
| C20:0 | 0.3 | 0.1 | 0.4 | 0.3 | 0.4 |
| C20:1 | 0.2 |  | 0.2 |  | 0.2 |

Also the solid fat content of the fats was determined at different temperatures using the analytical method described herein before. The following results were obtained:

|  | 1A | 1B | 1C | 1D | 1E |
|---|---|---|---|---|---|
| $N_{10}$ | 54.1 | 79.0 | 36.3 | 57.0 | 48.8 |
| $N_{20}$ | 25.4 | 40.7 | 4.9 | 30.6 | 10.9 |
| $N_{30}$ | 8.6 | 0.0 | 0.0 | 7.8 | 0.8 |
| $N_{35}$ | 4.9 | 0.0 | 0.0 | 1.5 | 0.0 |
| $N_{40}$ | 2.7 | 0.0 | 0.0 | 0.0 | 0.0 |

The ice cream samples were produced at an overrun of 100% on a pilot plant Votator®. A pre-emulsion was prepared by blending the ingredients and heating at 50° C. for 15 minutes. Next, the pre-emulsion was pasteurised by heating to 80° C. for 20 seconds. Subsequently, the pasteurised pre-emulsion was homogenised, cooled to 4° C. and kept overnight at this temperature. The ice cream samples were prepared by processing the homogenised emulsion in the Votator®.

The ice cream samples so obtained were first stored at −40° C. for 24 hours and subsequently at −18° C. for 3 weeks before being evaluated by a QDA sensory panel. The panel members were asked to rank the samples in order of preference. For each sample the average ranking was determined.

Sample 1B had the highest ranking and sample 1A the lowest. Of the remaining three samples, sample 1E had the highest score and sample 1C the lowest. In summary, the order of preference was: 1B, 1E, 1D, 1C, 1A.

Example 2

Another ice cream sample was produced using a fat that was identical to the fat used in sample 1C of Example 1, except that the fat blend had been interesterified. The ice cream sample was evaluated by a panel and found to be comparable in terms of sensory quality to sample 1C. The solid fat profile of the interesterified blend is depicted in the following table:

| | |
|---|---|
| $N_{10}$ | 49.8 |
| $N_{20}$ | 26.0 |
| $N_{30}$ | 0.0 |
| $N_{35}$ | 5.0 |
| $N_{40}$ | 0.0 |

Example 3

Ice cream samples were prepared as described in Example 1, using fats 1A, 1B and 1E.

Resistance to meltdown and to serum leakage of the ice cream samples was determined by measuring the rate at which the samples melt in a constant temperature environment, as follows. Stainless steel wire mesh grids having a size of 25×25 cm, with 3 mm holes, 1 mm thick wire were placed on a 60° funnel with a bore size of 2 cm suspended over a collecting vessel (of large enough volume to collect the entire sample tested). The collecting vessels were placed on a balance for weighing the material collected in the vessel. The balances are connected to a data logging system to record the mass collected. The apparatus consisting of grid, funnel, vessel and balance, were contained in a cabinet set at a constant temperature of 25° C.

The ice cream samples in the form of rectangular blocks measuring 14.5×9×3.8 cm were equilibrated in a freezer at −25° C. and then weighed on a zeroed balance with the grid (one of the largest flat faces of the sample was in contact with the grid). The samples were then placed on the funnels, following which the data logging system recorded the amount of collected material every minute. From the mass of the samples collected over this period, the percentage mass loss of the samples was calculated using the following formula:

% MassLoss=100×$(M_t-M_0)/F$ wherein:
$M_t$=mass recorded on the balance (gram) at time t minute
$M_0$=mass recorded on the balance (gram) at start of analysis, t=0 minute
F=Initial mass of product (gram) Meltdown Initiation Time The results obtained show that the initial melt of the three samples is very similar as all three samples show a MassLoss of about 5% after 50 minutes. During the subsequent period of 50-100 minutes, the following results were obtained:

| | % MassLoss | | |
|---|---|---|---|
| After | Sample 1A | Sample 1B | Sample 1E |
| 50 minutes | 6 | 5 | 4 |
| 60 minutes | 18 | 8 | 6 |
| 70 minutes | 33 | 18 | 12 |
| 80 minutes | 55 | 27 | 24 |
| 90 minutes | 75 | 36 | 47 |
| 100 minutes | 96 | 52 | 82 |

These results show that up to 90 minutes the melting behaviour of sample 1E is similar to that of sample 1B (coconut oil). Thus, it can be concluded that as far as fat melting characteristics are concerned the fat blend of sample 1E can suitably be used to replace coconut oil in ice cream. Clearly, sample 1A (palm oil) is much less suited.

The invention claimed is:

1. An aerated frozen food product comprising at least 0.5 wt. % fat and at least 30 wt. % water, said fat comprising:
   5-50 wt. % of a lauric fat component comprising at least 50% of $C_{10}$-$C_{14}$ fatty acids by weight of the total amount of fatty acids contained therein;
   0-90 wt % of a palm olein with an iodine value of at least 50; and
   0-50 wt. % of a palm mid fraction with an iodine value in the range of 35-45;
      wherein the combination of lauric fat component, palm olein and palm mid fraction represents at least 90 wt. % of the fat and wherein the fat does not contain hydrogenated fat;
said fat further being characterized by the following solid fat profile:
   40%<$N_{10}$<80%;
   7%<$N_{20}$<20%;
   $N_{35}$≤3%;
   $N_{10}$-$N_{30}$≥40%;
said fat further being characterized by the following fatty acid composition:
   less than 56% saturated fatty acids;
   not more than 60% unsaturated fatty acids;
   30%-42% monounsaturated fatty acids;
   30%-55% $C_{18}$ fatty acids;
   1.5%-15% $C_{12}$-$C_{14}$ fatty acids;
   35%-42% palmitic acid;
   ≤1.5% ω-3 unsaturated fatty acids; and
   ≤5% $C_4$-$C_{10}$ fatty acids;
all percentages being calculated from the weight of the total amount of fatty acids.

2. The food product according to claim 1, wherein the fat contains 2%-15% $C_{12}$-$C_{14}$ fatty acids by weight of total fatty acids.

3. The food product according to claim 2, wherein the fat contains 2.5-15% $C_{12}$-$C_{14}$ fatty acids by weight of total fatty acids.

4. An aerated frozen food product comprising at least 0.5 wt. % fat and at least 30 wt. % water, said fat being an interesterified fat blend comprising:
   5-50 wt. % of a lauric fat component comprising at least 50% of $C_{10}$-$C_{14}$ fatty acids by weight of the total amount of fatty acids contained therein;
   0-90 wt % of a palm olein with an iodine value of at least 50; and
   0-50 wt. % of a palm mid fraction with an iodine value in the range of 35-45;
      wherein the combination of lauric fat component, palm olein and palm mid fraction represents at least 90 wt.

% of the interesterified fat blend; and wherein the fat blend does not contain hydrogenated fat;

said fat further being characterized by the following solid fat profile:

40% < $N_{10}$ < 80%
3% < $N_{20}$ < 55%;

said fat further being characterized by the following fatty acid composition:

less than 56% saturated fatty acids;
not more than 60% unsaturated fatty acids;
30-42% monounsaturated fatty acids;
30%-55% $C_{18}$ fatty acids;
1.5%-15% $C_{12}$-$C_{14}$ fatty acids;
35%-42% palmitic acid;
≤1.5% ω-3 unsaturated fatty acids; and
≤5% $C_4$-$C_{10}$ fatty acids;

all percentages being calculated from the weight of the total amount of fatty acids.

5. The food product according to claim 4, wherein $N_{35}$≤10%.

6. The food product according to claim 1, comprising:
2-20 wt. % fat;
4-25 wt. % carbohydrates and/or sugar replacers;
2-10 wt. % protein; and
55-75 wt. % water.

7. The food product according to claim 4, wherein $N_{10}$-$N_{30}$≥40%.

* * * * *